United States Patent
Wier

Patent Number: 5,908,222
Date of Patent: Jun. 1, 1999

[54] VEHICLE SEAT WITH INTEGRATED BELT TENSIONER

[75] Inventor: Franz Wier, Göggingen, Germany

[73] Assignee: TRW Occupant Restraint Systems GmbH, Alfdorf, Germany

[21] Appl. No.: 08/842,189

[22] Filed: Apr. 23, 1997

[30] Foreign Application Priority Data

| Apr. 23, 1996 | [DE] | Germany | 296 07 362 U |
| May 6, 1996 | [DE] | Germany | 296 08 213 U |
| Feb. 6, 1997 | [DE] | Germany | 297 02 072 U |

[51] Int. Cl.$^6$ .............. A47C 31/00; B60R 22/40
[52] U.S. Cl. ............ 297/480; 297/468; 297/463.1
[58] Field of Search .............. 297/480, 468, 297/463.1; 280/805, 806

[56] References Cited

U.S. PATENT DOCUMENTS

| 4,423,846 | 1/1984 | Fohl . | |
| 4,444,010 | 4/1984 | Bender | 280/806 |
| 4,449,443 | 5/1984 | Fohl . | |
| 4,932,722 | 6/1990 | Motozawa | 297/480 |
| 5,145,209 | 9/1992 | Lenzen | 297/480 |
| 5,207,618 | 5/1993 | Nishizawa | 280/806 |
| 5,308,148 | 5/1994 | Peterson et al. . | |
| 5,634,690 | 6/1997 | Watanabe et al. | 297/480 |
| 5,707,080 | 1/1998 | Isaji et al. | 297/480 |

FOREIGN PATENT DOCUMENTS

| 625450 | 11/1994 | European Pat. Off. | 280/806 |
| 2491647 | 4/1982 | France . | |
| 3131637 | 1/1983 | Germany . | |
| 8812852 | 12/1988 | Germany . | |

Primary Examiner—Peter R. Brown
Assistant Examiner—Anthony D. Barfield
Attorney, Agent, or Firm—Tarolli, Sundheim, Covell, Tummino & Szabo

[57] ABSTRACT

A vehicle seat with an integrated belt tensioner secured thereto comprises a seat part, a seat frame and a connection element to connect the piston of the belt tensioner to the safety belt. The tube of the belt tensioner is curved transversely to its longitudinal extent and is substantially adapted to the outer contour of the side wall in the region of the side wall of the seat part so that the belt tensioner only slightly projects from the side of the vehicle seat. In addition, due to the curved tube a relatively long tensioning path results.

18 Claims, 6 Drawing Sheets

VEHICLE SEAT WITH INTEGRATED BELT TENSIONER

TECHNICAL FIELD

The invention relates to a vehicle seat.

BACKGROUND OF THE INVENTION

Vehicle seats customary hitherto to which a belt tensioner is secured require a relatively large construction space, since the tube as part of a piston/cylinder unit is relatively long and projects sidewardly from the seat. In addition, the belt tensioner is to be installed so that in the case of restraint a possibly linear force initiation from the safety belt towards the piston is achieved. This requirement reduces the possibilities of installation for belt tensioners.

BRIEF SUMMARY OF THE INVENTION

The invention provides a vehicle seat with an integrated belt tensioner whereby the belt tensioner may be adapted to the conditions in the vehicle and also only slightly projects sidewardly from the vehicle seat. The vehicle seat has a seat part, a seat frame, a belt tensioner comprising a tube, a piston arranged in the tube as well as a drive means to displace the piston in the case of restraint, and a connection element serving to connect the piston with a safety belt. The seat part comprises a side wall with an outer contour. The tube is attached to the seat frame and is substantially adapted to the outer contour of the side wall by being curved over at least a part of its longitudinal extent transversely thereto Through the curvature of the tube, the belt tensioner can be optimally adapted to the course of the side wall of the vehicle seat as a result of which the belt tensionere without requiring the tensioning path to be reduced as compared to tensioners known hitherto, is relatively small. The vehicle seat and the belt tensioner attached thereto constitute an optically closed unity. Parts obstructing the optimum course of the tube can be bypassed by means of curving the tube without requiring any expenditure on part of the tensioning path.

From the DE 30 37 738 a tensioner for a belt retractor is known in which a piston/cylinder unit comprises a curved tube. However, the curved tube is not arranged at the vehicle seat but at locations in the vehicle difficult to access, for example, behind the back of the rear seat bench and is secured to the vehicle construction.

According to a preferred embodiment, the tube even extends over a majority of its length beneath the vehicle seat, where more room for construction is available.

In order to enable more intensive radii of curvature it is, in addition, advantageous if the piston in the region of an axial end lies against the tube on the inner side with at least one annular guide surface having a small axial extent. In the region of its opposite ends, it is to be spaced apart radially from the tube so that a longitudinal displacement of the piston is possible. If a guide surface with a small axial extent is provided, the piston can move without jamming in the tube. The easy displaceability of the piston can be increased in that it has an elastically flexible seal which surrounds the guide surface. The flexibility can be achieved by a suitable choice of material (plastic or light metal) and/or by the structural embodiment of the seal.

Advantageously, the connection element is a traction cable which is fastened to the piston and which emerges from the tube on the end face. The opening of the tube on the end face is closed by a guide element with a through opening, through which the traction cable extends. The guide element thus has a dual function by serving to seal the interior of the tube and to guide the traction cable. So that the traction cable, in the case of restraint, does not chafe against the edge at the end of the through opening and is thereby damaged, the through opening widens outwards.

DETAILED DESCRIPTION OF PREFERRED EMBODIMENTS

Figure 1A:
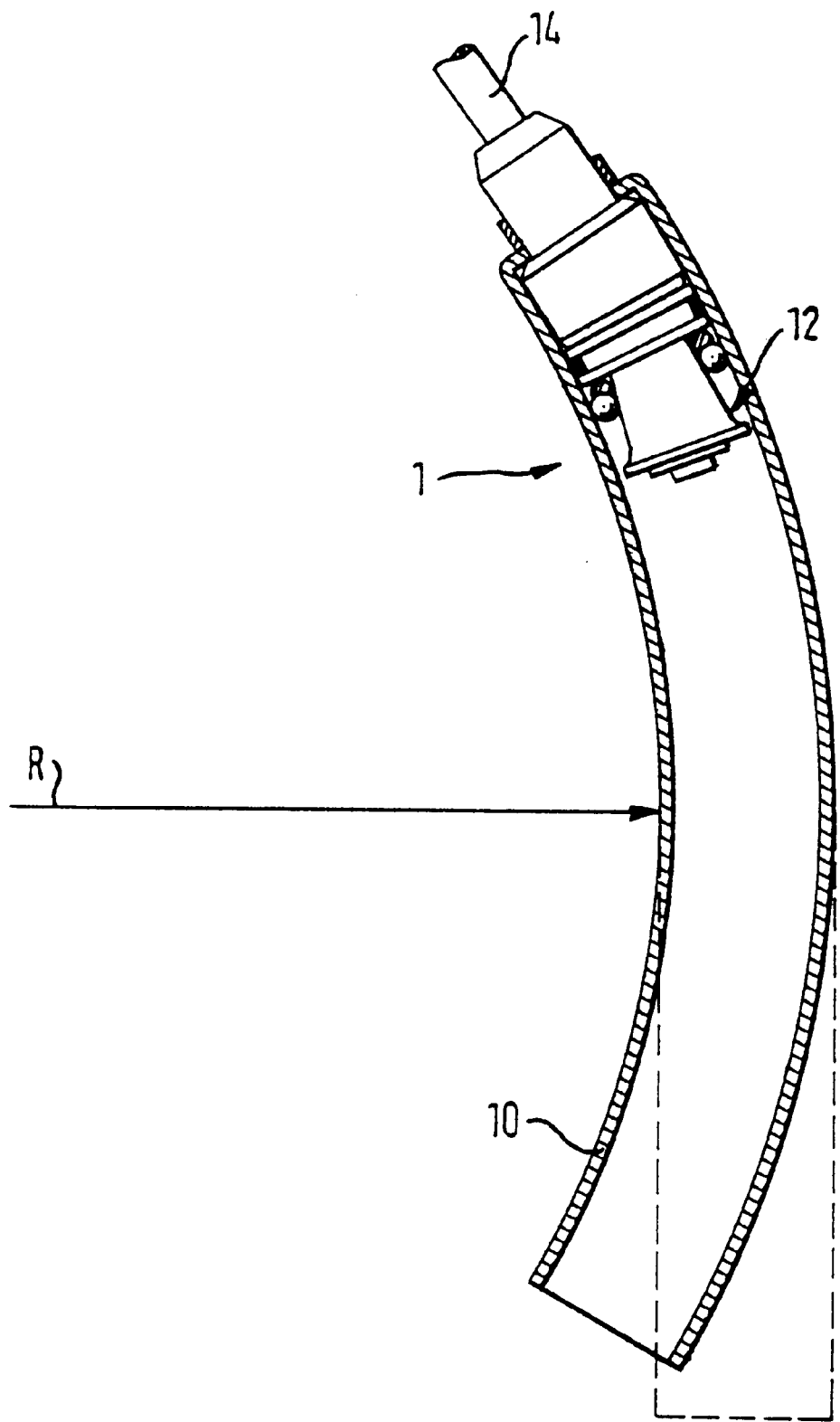
FIG. 1a shows a longitudinal sectional view through the belt tensioner provided by the vehicle seat according to the invention.

In FIG. 1a a belt tensioner 1 for a safety belt is shown, which has a tube 10, a piston 12 arranged therein so as to be displaceable, and a traction cable 14 fastened at one end to the piston 12 and at the other end to a belt buckle (not shown), which traction cable 14 acts as a connection element between the two parts. A pyrotechnic propellant charge, the position of which will be explained in further detail below in connection with FIG. 2, serves as drive means for the piston 12 moving within the tube 10 in the case of restraint The tube 10, in its entire longitudinal extent, is curved transversely thereto and in one plane. R designates here the radius of curvature. According to the structural space available in the vehicle, the tube 10, however, may also only be curved in the upper section, as is indicated in broken lines. In the latter embodiment, the tube 10 has a lower uncurved section and an upper curved section. The radius of curvature R must therefore be coordinated with the piston geometry and the tube geometry so that the piston 12 is movable within the tube 10. For this, it is necessary that the piston 12 does not have a guide surface which is too long, viewed in axial direction, or guide surfaces lying too far apart, by which it lies against the inner side of the tube 10, which would lead to the jamming of the piston 12 in the tube 10.

Figure 1B:
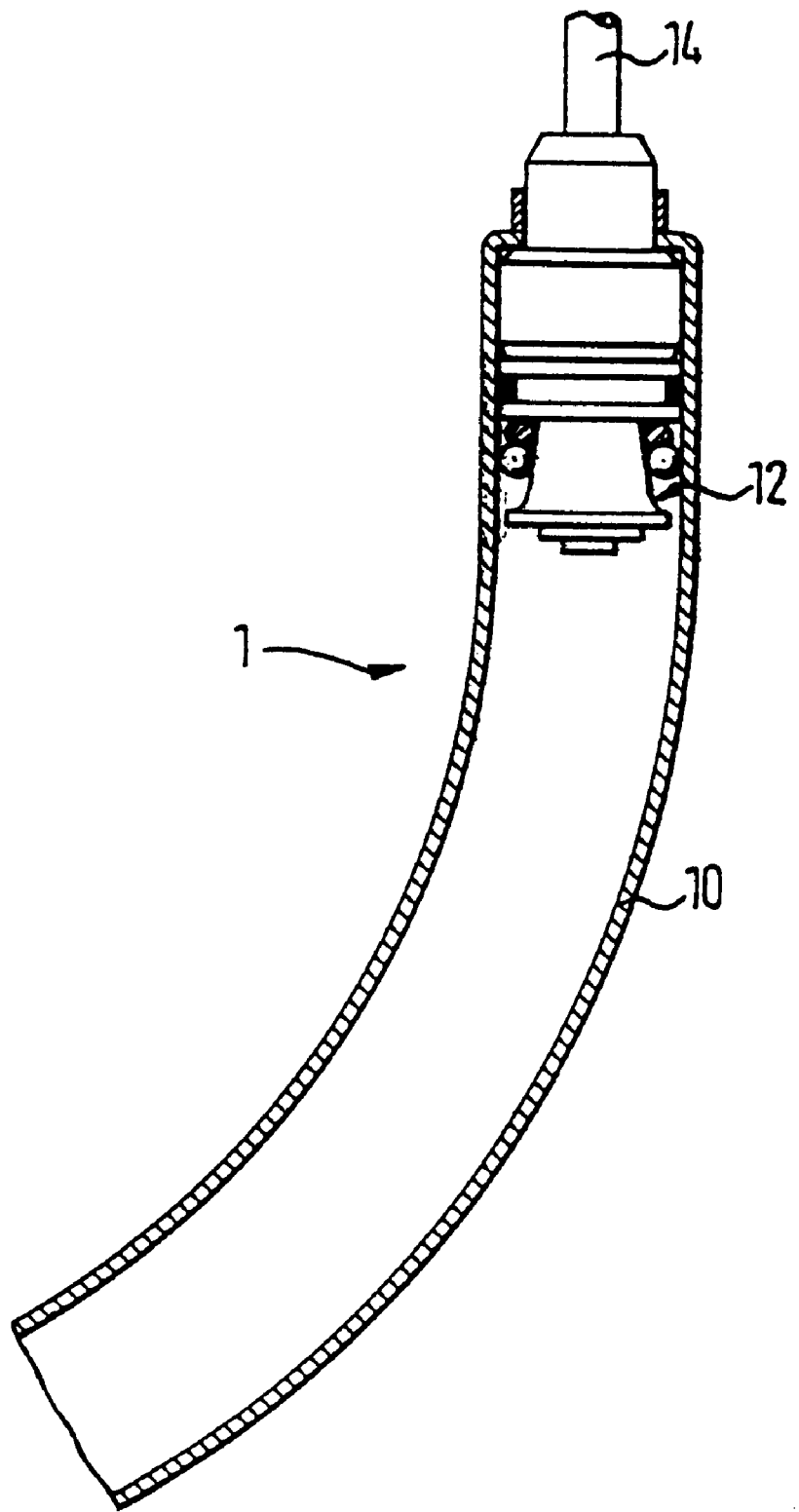
FIG. 1b shows a longitudinal sectional view through the belt tensioner in accordance with another embodiment.

FIG. 1b shows a further embodiment of the belt tensioner, the tube 10 of which at the end of the belt buckle side has a non-curved section having approximately the same length as the piston 12. By providing this straight embodiment of the tube 10 in the region of the emergence of the traction cable 14, the traction cable 14 is guided precisely and the frictional forces between the traction cable 14 and the outlet opening, to be explained in further detail below, from the tube 10 can be reduced.

Figure 2:
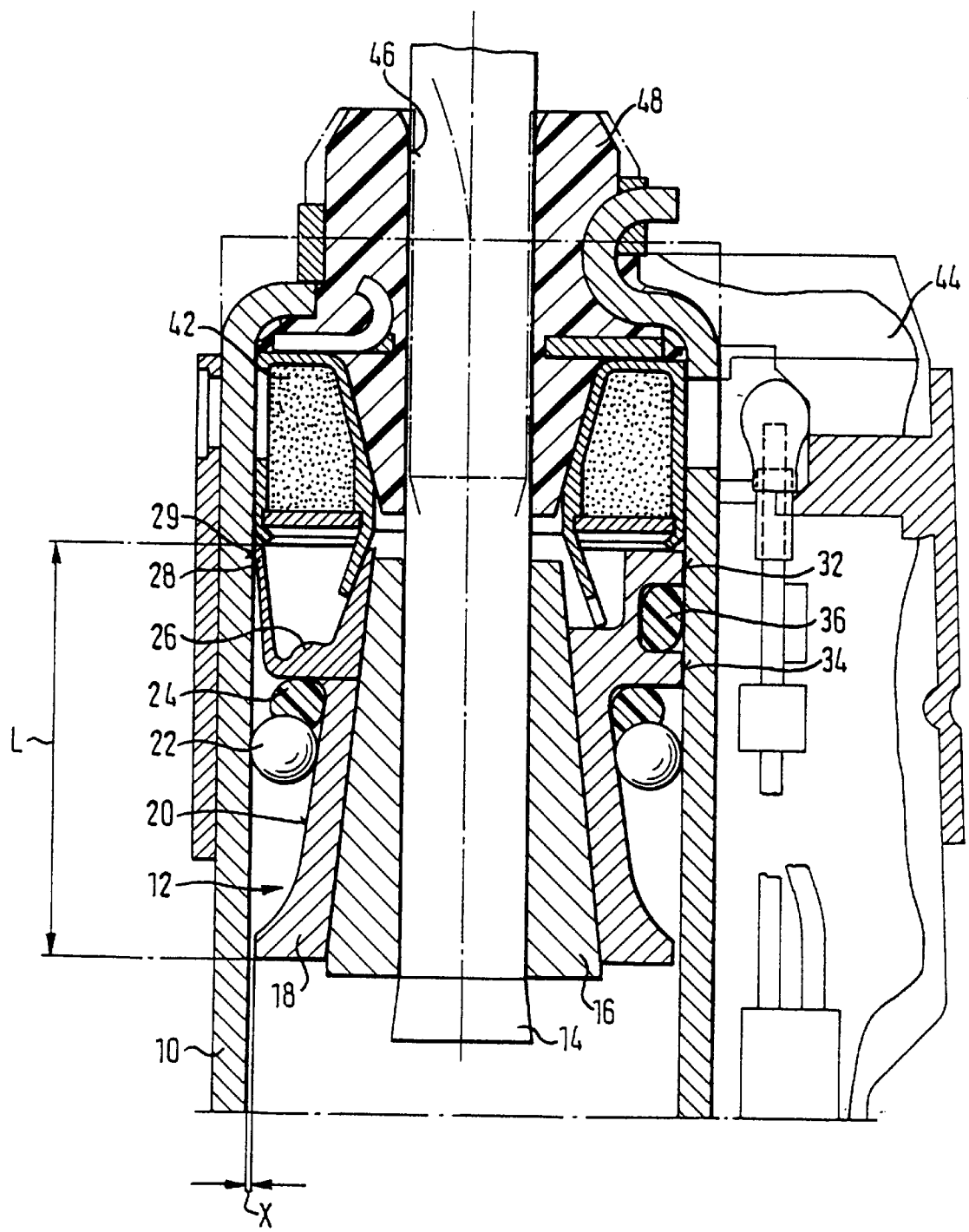
FIG. 2 shows an enlarged longitudinal sectional view of the belt tensioner in the region of the piston, in which the left-hand and right-hand halves of the view show different variants of the piston.

In FIG. 2 it is illustrated with the aid of two variants how the piston 12 can be configured in order to be able to be displaced in tubes with relatively small radii of curvature. the piston 12 is composed of several parts, namely a tapered holding part 16 for the traction cable 14 and also a part 18 surrounding the holding part 16. The part 18 has a conical outer surface 20 against which several locking members 22 in the form of balls lie. The position of the locking members 22, which in the starting position shown in FIG. 2 also lie against the inner wall of the tube 10, is additionally established by an elastic ring 24. In the embodiment shown in FIG. 2 on the left-hand half, a seal 26 adjoins the tubular part 18. The seal 26 is an upwardly open rotation body with a U-shaped cross-section. An outer covering section of the seal 26 runs conically outwards up to its free rim 28. In the region of the free rim 28, an axially short circulating guide surface 29 is provided, which lies against the inner side of the tube 10. As the covering section, owing to its small thickness and the light metal which is used, is elastically flexible, the guide surface 29 can not lead to the piston 12 jamming in the curved tube 10.

In the embodiment shown in the right-hand half of FIG. 2, the guide surface is longer in axial direction and is formed by two circulating contact surfaces 32, 34, which represent seals, between which an additional ring seal 36 is present.

The end of the piston 12 lying opposite the seal 26 and the ring seal 36 does not lie against the inner side of the tube 10, but rather is spaced apart therefrom, as illustrated by the gap X. The outer covering surface of the part 18 in this region can in fact, on movement within the tube 10, strike against its inner wall and thus serve as a guide surface; however, the relationship of the gap X to the maximum spacing L of the guide surfaces is coordinated with the radius of curvature of the tube 10 so that a jamming of the piston 12 cannot occur.

A chamber 42 provided in the region of the upper end of the tube 10 is filled with a pyrotechnic propellant charge 42 which can be activated by means of an electric igniter 44. Adjoining the chamber is a guide element 48, which seals off the tube 10 in a gas-tight manner on the end face. The traction cable 14 extends through a through opening 46 in the guide element 48, which widens towards the exterior, so that no sharp edge is present on which the traction cable 14 could be damaged. If the traction cable 14 has to run obliquely out from the tube 10, the central axis of the through opening 46 can also be curved, as is indicated by broken lines.

After the tensioning process is completed, the locking members 22 lying against the conical outer section 20 prevent a drawing back of the piston 12. If, in addition, a plastic deformation of the tube 10 or of the ring 18 by the locking member 22 is permitted, this can lead to a force limitation for the maximum forces occurring in the belt.

Figure 3:
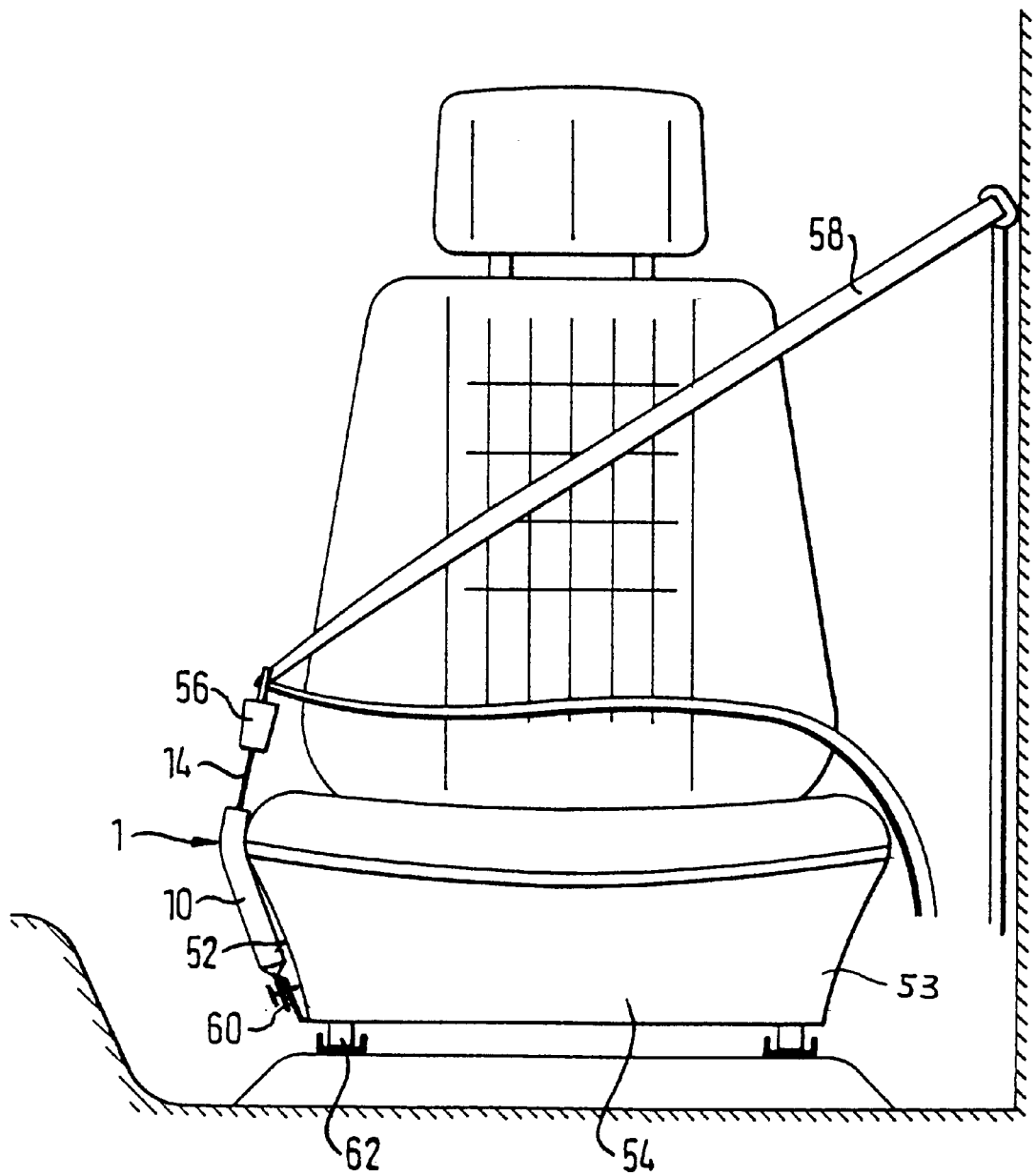
FIG. 3 shows a front view of the vehicle seat according to the invention with a belt tensioner fastened thereon, in accordance with a first embodiment.

In FIG. 3, a belt tensioner 1 is illustrated which in this case is configured as a buckle tensioner and which is secured to a vehicle seat 54 according to the invention and forms a unit with it. Although the tensioning path possible by the belt tensioner 10 is very long, the construction space required for the belt tensioner is relatively small. In addition, the belt tensioner 1 only projects slightly with respect to the vehicle seat. The tube 10 is adapted exactly to a side wall 52 of the vehicle seat 54, so that it follows the contour of the side wall 52. The tube 10 has a curvature in its upper third, such curvature leading to the belt buckle 56, which is fastened to the traction cable 14, being inclined slightly towards the vehicle seat 54 and being well adapted to the run of the safety belt 58. At the lower end of the tube 10, the tube wall is pressed together and forms a flange 60 by which the tube 10, which may be pivotable if necessary, is screwed to the seat frame 62. The belt tensioner 1 can be mounted at the vehicle seat 54 prior to the installation of the seat into the vehicle provided the accessibility for securing the belt tensioner 1 is not limited. As a result of the adaptation of the belt tensioner 1 to the contour of the side wall 52 of the seat part 53, the risk of the vehicle occupant being tangled with the belt tensioner 1 and the unintentional displacement of the belt tensioner 1 can be reduced.

Figure 4:
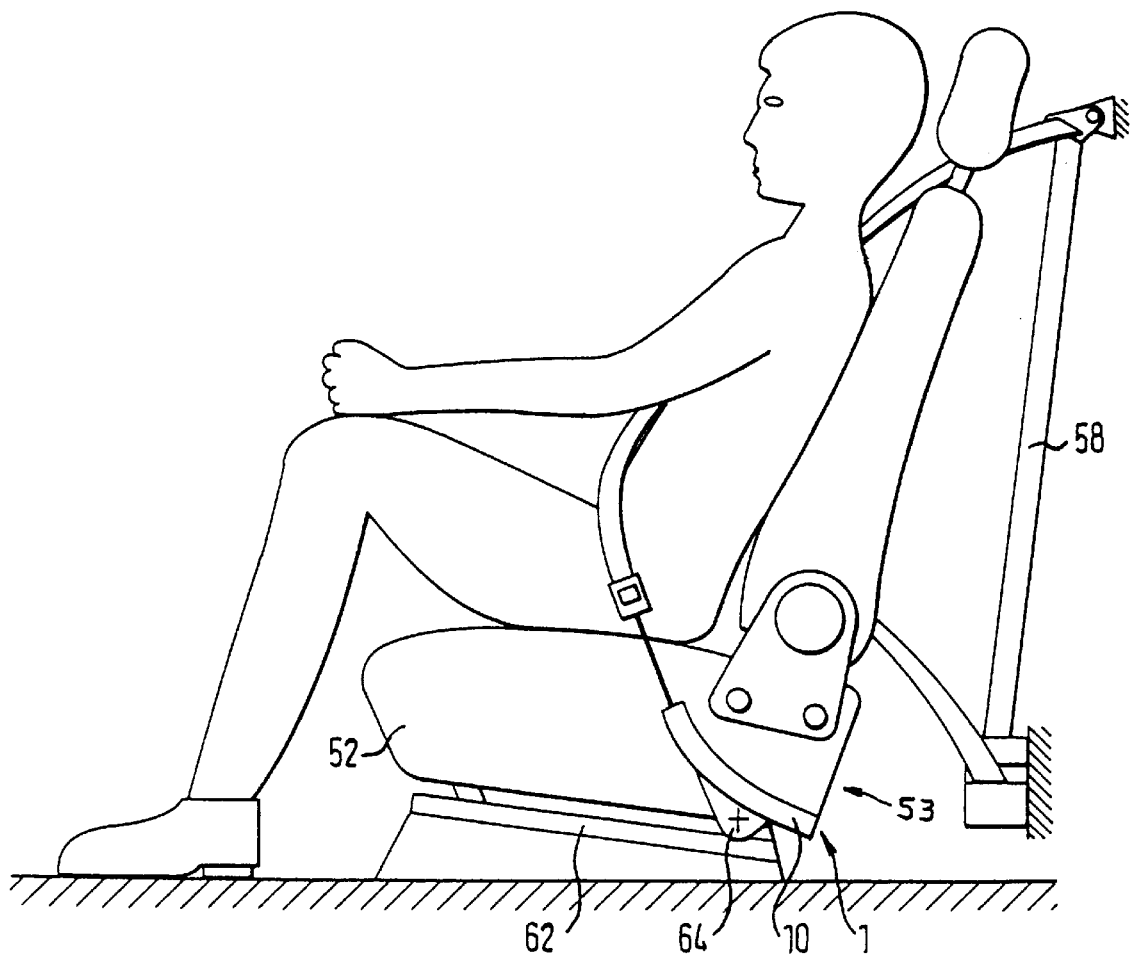
FIG. 4 shows a side view of the vehicle seat according to the invention with a belt tensioner fastened thereon in accordance with a second embodiment.

In embodiment illustrated in FIG. 4, a flange 64 is welded to the outer wall of the tube 10, which flange 64 serves for the fastening of the tube 10 to the seat frame 62. In side view, the tube 10 is bent on the one hand obliquely upwards and on the other hand obliquely outwards and is hence bent in two planes. The tube 10 extends from a lower rear end of the seat part 53, seen in side view, along the side wall 52 bow-shaped forwards and upwards. This embodiment provides an optimal adaptation of the course of the tube 10 to the course of the safety belt 58.

Figure 5:
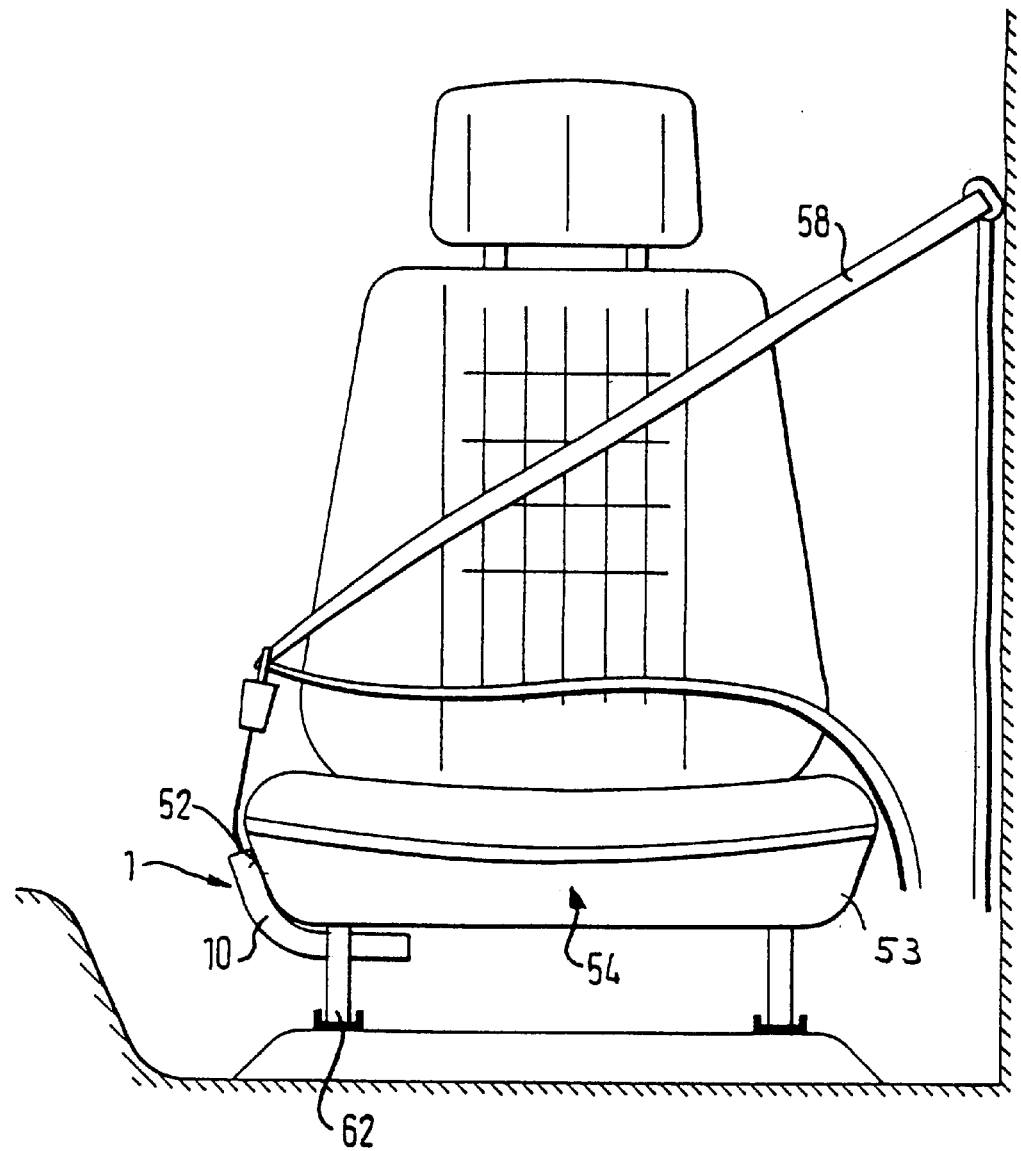
FIG. 5 shows a front view of the vehicle seat according to the invention with a belt tensioner fastened thereon, in accordance with a third embodiment.

In the embodiment of the belt tensioner 1 illustrated in FIG. 5, the tube 10, adapted to the contour of the side wall 52, extends to below the seat 54, where it is fastened to the seat frame 62. This embodiment has the advantage that the tube 10 and hence the tensioning path can be very long, without this leading to accommodation problems in the vehicle. The tube is screwed onto the seat frame 62 below the seat part 53. Depending on the length of the tube 10 and the traction cable, only a small or a large part of the tube 10 can extend up to below the vehicle seat 54.

I claim:

1. A vehicle seat comprising a seat part, a seat frame, a belt tensioner comprising a tube, a piston arranged in said tube, a drive means to displace said piston in said tube and a connection element adapted to connect said piston with a safety belt, said seat part comprising a side wall with an outer contour, said tube being attached to said seat frame and being substantially adapted to said outer contour of said side wall by being curved over at least a part of its longitudinal extent transversely to its longitudinal extent, thereby defining an at least partly curved displacement path wherein said piston travels along said at least partly curved displacement path.

2. The vehicle seat according to claim 1, wherein said tube has a fastening flange projecting radially therefrom to arrest said tube on said seat frame.

3. The vehicle seat according to claim 1, wherein said tube has a lower end, said lower end having a fastening flange projecting in a longitudinal direction to arrest said tube.

4. The vehicle seat according to claim 3, wherein said fastening flange is formed by said lower end of said tube being pressed together.

5. The vehicle seat according to claim 1, wherein said seat having a lower rear end and said tube extends from said lower rear end of said seat part along said side wall in a bow-shaped manner forwards and upwards.

6. The vehicle seat according to claim 1, wherein said belt tensioner is configured as a buckle tensioner.

7. The vehicle seat according to claim 1, wherein said tube extends to below said vehicle seat.

8. The vehicle seat according to claim 7, wherein said tube, over the majority of its length, extends beneath said vehicle seat.

9. The vehicle seat according to claim 7, wherein said tube is secured below said vehicle seat to said seat frame.

10. The vehicle seat according to claim 1, wherein said piston has two opposite axial ends and at least one circulating guide surface at one end of said axial ends with a small axial extent, said piston lying against said tube with said guide surface and said piston being sufficiently radially spaced apart from said tube at said opposite axial end of said piston in order to enable a longitudinal displacement of said piston in said tube.

11. The vehicle seat according to claim 10, wherein said piston has an elastically flexible seal which embraces said guide surface.

12. The vehicle seat according to claim 11, wherein said seal is a rotation body which is open towards said drive means, said seal having a U-shaped cross-section and an elastically flexible covering section widening conically towards said drive means, which covering section has a free rim and lies against said tube in a region of said covering section around said free rim.

13. The vehicle seat according to claim 1, wherein said piston is moved in a tensioning direction by said drive means and has a conical outer surface between its axial ends with locking members lying thereagainst which largely prevent a movement of said piston in a direction opposite to said tensioning direction.

14. The vehicle seat according to claim 1, wherein said connection element is a traction cable and wherein said tube on one end face has a guide element, secured thereon, for said traction cable, said guide element having an outwardly widening through opening through which said traction cable extends.

15. The vehicle seat according to claim 14, wherein said through opening has a curved central axis.

16. The vehicle seat according to claim 1, wherein said tube has an end face and is not curved in a region around its axial end from which said connection element emerges on said end face.

17. The vehicle seat according to claim 16, wherein said non-curved region of said tube has approximately the same length as said piston.

18. A vehicle seat comprising a seat part, a seat frame, a belt tensioner comprising a tube, a piston arranged in said tube as well as a drive means to displace said piston in said tube, and a connection element adapted to connect said piston with a safety belt, said seat part comprising a side wall with an outer contour, said tube being attached to said seat frame and being substantially adapted to said outer contour of said side wall by being curved over at least a part of its longitudinal extent transversely to its longitudinal extent, wherein said piston has two opposite axial ends and at least one circulating guide surface at one of said axial ends with a small axial extent, said piston lying against said tube with said guide surface and said piston being sufficiently radially spaced apart from said tube at said opposite axial end of said piston in order to enable a longitudinal displacement of said piston in said tube, wherein said piston has an elastically flexible seal which embraces said guide surface, and wherein said seal is a rotation body which is open towards said drive means, said seal having a U-shaped cross-section and an elastically flexible covering section widening conically towards said drive means, which covering section has a free rim and lies against said tube in a region of said covering section around said free rim.

\* \* \* \* \*